(12) United States Patent
Asami

(10) Patent No.: US 6,261,352 B1
(45) Date of Patent: Jul. 17, 2001

(54) WATER-BASED BALL-POINT PEN INK COMPOSITION

(75) Inventor: Hideaki Asami, Aichi (JP)

(73) Assignee: The Pilot Ink Co., Ltd., Aichi (JP)

( * ) Notice: Subject to any disclaimer, the term of this patent is extended or adjusted under 35 U.S.C. 154(b) by 0 days.

(21) Appl. No.: 09/328,486

(22) Filed: Jun. 9, 1999

(30) Foreign Application Priority Data

Jun. 9, 1998 (JP) .................................. 10-178110

(51) Int. Cl.$^7$ .................................. C09D 11/18
(52) U.S. Cl. .................................. 106/31.58; 106/31.86; 106/31.59; 106/31.89
(58) Field of Search .................................. 106/31.58, 31.86, 106/31.89, 31.59

(56) References Cited

U.S. PATENT DOCUMENTS

| | | | |
|---|---|---|---|
| 4,509,982 | * 4/1985 | Iijima | 106/31.86 |
| 4,545,818 | 10/1985 | Inoue et al. | 106/22 |
| 5,466,283 | 11/1995 | Kondo et al. | 106/25 R |
| 5,702,510 | * 12/1997 | Yoshida et al. | 106/31.86 |
| 5,767,172 | 6/1998 | Fukasawa | 523/161 |
| 5,785,746 | 7/1998 | Kito et al. | 106/31.86 |
| 5,990,201 | * 11/1999 | Miyazaki et al. | 106/31.89 |

FOREIGN PATENT DOCUMENTS 6-256699   9/1994 (JP) .............................. C09D/11/18

* cited by examiner

Primary Examiner—Helene Klemanski
Assistant Examiner—Veronica F. Faison
(74) Attorney, Agent, or Firm—Sughrue, Mion, Zinn, Macpeak & Seas, PLLC

(57) ABSTRACT

Disclosed is a water-based ball-point pen ink composition which gives a smooth writing touch and shows various satisfactory writing performance, comprising a colorant, water, and as an agent for imparting shear-thinning properties at least one member selected from sulfosuccinates represented by the following general formula (1):

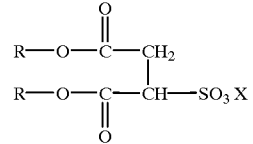

(1)

wherein each R represents an alkyl or alkenyl group having 7 to 18 carbon atoms and X represents an alkali metal or an amine, the content of the at least one member being from 5 to 50% by weight.

2 Claims, No Drawings

WATER-BASED BALL-POINT PEN INK COMPOSITION

BACKGROUND OF THE INVENTION

1. Field of the Invention

The present invention relates to a water-based ball-point pen ink composition. More particularly, this invention relates to a water-based ball-point pen ink composition which shows shear-thinning properties.

2. Description of the Related Art

Agents for imparting shear-thinning properties have been disclosed which are to be added to water-based ink compositions for use in ball-point pens of the type in which when the ball-point pen is allowed to stand without imposition of shear stress on the ink, then the ink has a high viscosity and is stably held in the ball-point pen mechanism, and when the ball-point pen is in use for writing, then that part of the ink which is in the vicinity of the ball becomes less viscous due to the shear stress resulting from the ball rotation and is hence transferred to the paper surface. Examples of such prior art agents for imparting shear-thinning properties include water-dispersible gums and polysaccharides (see U.S. Pat. Nos. 4,545,818 and 5,466,283), organic polymeric compounds such as crosslinkable acrylic resins (see U.S. Pat. No. 5,767,172), inorganic compounds such as fine inorganic particles (see JP-A-6-256699; the term "JP-A" as used herein means an "unexamined published Japanese patent application"), and nonionic surfactants (see U.S. Pat. No. 5,785,746).

SUMMARY OF THE INVENTION

The present inventors made investigations on novel agents for imparting shear-thinning properties which are to be added to water-based ball-point pen ink compositions of the above-described conventional type. As a result, it has been found that a shear-thinning ink composition which gives a smooth writing touch and shows various satisfactory writing performances, including the property of less undergoing ink dripping or feathering, is obtained by incorporating a specific anionic surfactant into an ink. The present invention has been completed based on this finding.

The present invention provides a water-based ball-point pen ink composition comprising a colorant, water, and as an agent for imparting shear-thinning properties at least one member selected from sulfosuccinates which are represented by the following general formula (1):

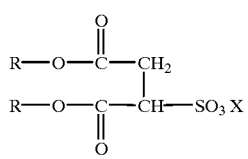

(1)

wherein each R represents an alkyl or alkenyl group having 7 to 18 carbon atoms and X represents an alkali metal or an amine, the content of said at least one member being from 5 to 50% by weight.

The present invention further provides: the above ink composition in which the content of the sulfosuccinate is from 5 to 20% by weight; the above ink composition which contains a betaine; and the above ink composition which has a viscosity of from 20 to 200 mPa·s (25° C.) as measured with an E type rotational viscometer at 100 rpm and a shear-thinning index of from 0.1 to 0.7.

DETAILED DESCRIPTION OF THE INVENTION

As described above, the water-based ball-point pen ink composition having shear-thinning properties of the present invention is characterized in that it contains at least one anionic surfactant represented by general formula (1) in an amount of from 5 to 50% by weight. The present inventors have found that by packing this ink into a reservoir tube, a ball-point pen having satisfactory writing performances is obtained.

Anionic surfactants have conventionally been known to function, e.g., as a dispersant for pigments or a penetrant for enhancing penetration into paper when added to inks in a small amount. However, when an anionic surfactant represented by general formula (1) is added in a large amount to an ink, it imparts shear-thinning properties to the ink as described above. The reasons for this are thought to be as follows. In the water-based ink, the surfactant is present in a dispersed state, i.e., an emulsified state, due to the hydrophobic groups thereof. In addition, interactions occur such as the formation of an electrical double layer between molecules and the formation of adsorptive crosslinks between molecules. As a result, a three-dimensional network structure is formed and the ink hence has a high viscosity. Upon imposition of a strong shear force, the three-dimensional network structure is temporarily weakened and the ink hence comes to have a low viscosity.

The surfactant used in the present invention is added to an ink in an amount of generally from 5 to 50% by weight, preferably from 5 to 20% by weight, based on the ink composition.

If the content of the surfactant is lower than 5% by weight, it is difficult to impart the necessary shear-thinning properties to the water-based ball-point pen ink. If the content thereof exceeds 50% by weight, not only insufficient ink transfer is apt to occur in writing, but also the desired viscosity decrease is not obtained under high-shear conditions, making it difficult to obtain proper ink outflow corresponding to a writing speed.

The sulfosuccinates which are represented by general formula (1) mean alkali metal salts, e.g., sodium and potassium salts, ammonium salts, or alkanol amine salts, e.g., monoethanolamine, diethanolamine, and triethanolamine salts. In these salts, the alkyl or alkenyl groups each has from 7 to 18 carbon atoms, preferably from 8 to 15 carbon atoms. If a sulfosuccinate salt in which the alkyl or alkenyl groups each has less than 7 carbon atoms is used, this surfactant more readily dissolves in an ink because the hydrophobic parts thereof have enhanced miscibility with water. As a result, this surfactant is less apt to form a three-dimensional network structure based on the hydrophobic parts and the ink does not show shear-thinning properties. On the other hand, if a sulfosuccinate salt in which the alkyl or alkenyl groups each has more than 18 carbon atoms is used, this surfactant has poor dispersion stability in an ink although the hydrophobic parts thereof have reduced miscibility with water. As a result, this surfactant is less apt to form an even three-dimensional network structure in the ink.

The alkyl or alkenyl groups each may be linear or branched.

In each of the surfactants represented by general formula (1), one of the R's may be an alkyl group and the other may be an alkenyl group.

Examples of the anionic surfactants that can be used in the present invention are given below. However, the surfactants should not be construed as being limited thereto.

The examples include:
sodium diheptylsulfosuccinate,
potassium diheptylsulfosuccinate,
ammonium diheptylsulfosuccinate,
triethanolamine diheptylsulfosuccinate,
sodium di(1-methylhexyl)sulfosuccinate,
potassium di(1-methylhexyl)sulfosuccinate,
ammonium di(1-methylhexyl)sulfosuccinate,
triethanolamine di(1-methylhexyl)sulfosuccinate,
sodium di(1-propylbutyl)sulfosuccinate,
potassium di(1-propylbutyl)sulfosuccinate,
ammonium di(1-propylbutyl)sulfosuccinate,
triethanolamine di(1-propylbutyl)sulfosuccinate,
sodium dioctylsulfosuccinate,
potassium dioctylsulfosuccinate,
ammonium dioctylsulfosuccinate,
triethanolamine dioctylsulfosuccinate,
sodium di(1-ethylheptyl)sulfosuccinate,
potassium di(1-ethylheptyl)sulfosuccinate,
ammonium di(l-ethylheptyl)sulfosuccinate,
triethanolamine di(1-ethylheptyl)sulfosuccinate,
sodium di(2-ethylhexyl)sulfosuccinate,
potassium di(2-ethylhexyl)sulfosuccinate,
ammonium di(2-ethylhexyl)sulfosuccinate,
triethanolamine di(2-ethylhexyl)sulfosuccinate,
sodium dinonylsulfosuccinate,
potassium dinonylsulfosuccinate,
ammonium dinonylsulfosuccinate,
triethanolamine dinonylsulfosuccinate,
sodium di(1-methyl-4-ethylhexyl)sulfosuccinate,
potassium di(1-methyl-4-ethylhexyl)sulfosuccinate,
ammonium di(1-methyl-4-ethylhexyl)sulfosuccinate,
triethanolamine di(1-methyl-4-ethylhexyl)sulfosuccinate,
sodium didecylsulfosuccinate,
potassium didecylsulfosuccinate,
ammonium didecylsulfosuccinate,
triethanolamine didecylsulfosuccinate,
sodium diundecylsulfosuccinate,
potassium diundecylsulfosuccinate,
ammonium diundecylsulfosuccinate,
triethanolamine diundecylsulfosuccinate,
sodium di(1-methyl-4-ethyloctyl)sulfosuccinate,
potassium di(-methyl-4-ethyloctyl)sulfosuccinate,
ammonium di(1-methyl-4-ethyloctyl)sulfosuccinate,
triethanolamine di(1-methyl-4-ethyloctyl)sulfosuccinate,
sodium didodecylsulfosuccinate,
potassium didodecylsulfosuccinate,
ammonium didodecylsulfosuccinate,
triethanolamine didodecylsulfosuccinate,
sodium ditridecylsulfosuccinate,
potassium ditridecylsulfosuccinate,
ammonium ditridecylsulfosuccinate,
triethanolamine ditridecylsulfosuccinate,
sodium ditetradecylsulfosuccinate,
potassium ditetradecylsulfosuccinate,
ammonium ditetradecylsulfosuccinate,
triethanolamine ditetradecylsulfosuccinate,
sodium dipentadecylsulfosuccinate,
potassium dipentadecylsulfosuccinate,
ammonium dipentadecylsulfosuccinate, and
triethanolamine dipentadecylsulfosuccinate, The incorporation of a betaine into an ink containing at least one of the anionic surfactants is highly effective in forming a three-dimensional network structure and stabilizing the same.

Preferred betaines for use in the present invention are amphoteric surfactant type betaines. Examples thereof include lauryldimethylaminoacetic acid betaine, stearyldimethylaminoacetic acid betaine, (coconut oil fatty acid amide) propyldimethylaminoacetic acid betaine, lauramidepropyl betaine, imidazolinium betaines such as 2-alkyl-N-carboxymethyl-N-hydroxyethylimidazolinium betaines, 2-alkyl-N-carboxyethyl-N-hydroxyethylimidazolinium betaines, and 2-alkylsodiumcarboxymethyl-N-carboxymethyloxyethylimidazolinium betaines, e.g., undecyl-N-hydroxyethyl-N-carboxymethylimidazolinium betaine and lauryl-N-carboxymethyl-N-hydroxyethylimidazolinium betaine. Such betaines may be used alone or in combination of two or more thereof.

The betain used in the present invention is added to an ink in an amount of preferably from 1.5 to 15% by weight, more preferably from 2 to 10% by weight, based on the ink composition.

In the case of using a pigment as the colorant, the pigment may be added as a dispersion prepared beforehand by dispersing the pigment in a medium containing a betaine or in a medium containing both a betaine and a compound represented by general formula (1). This is effective not only in facilitating the formation of a three-dimensional network structure and stabilizing the same, but also further improving the dispersion stability of the pigment in the ink composition.

Any of the dyes and pigments soluble or dispersible in an aqueous medium can be used as the colorant. Examples thereof are as follows.

Usable as the dyes are acid dyes, basic dyes, direct dyes, etc.

Examples of the acid dyes include
New Coccine (C.I. 16255),
Tartrazine (C.I. 19140),
Acid Blue Black 10B (C.I. 20470),
Guinea Green (C.I. 42085),
Brilliant Blue FCF (C.I. 42090),
Acid Violet 6BN (C.I. 43525),
Soluble Blue (C.I. 42755),
Naphthalene Green (C.I. 44025),
Eosine (C.I. 45380),
Phloxine (C.I. 45410),
Erythrosine (C.I. 45430),
Nigrosine (C.I. 50420), and
Acid Flavin (C.I. 56205).

Examples of the basic dyes include
Chrysodine (C.I. 11270),
Methyl Violet FN (C.I. 42535),
Crystal Violet (C.I. 42555),
Malachite Green (C.I. 42000),
Victoria Blue FB (C.I. 44045),
Rhodamine B (C.I. 45170),
Acridine Orange NS (C.I. 46005), and
Methylene Blue B (C.I. 52015).

Examples of the direct dyes include
Congo Red (C.I. 22120),
Direct Sky Blue 5B (C.I. 24400),
Violet BB (C.I. 27905),
Direct Deep Black EX (C.I. 30235),
Kayarus Black G Conc (C.I. 35225),
Direct Fast Black G (C.I. 35255), and
Phthalocyanine Blue (C.I. 74180).

Usable as the pigments are inorganic pigments such as carbon black and ultramarine, organic pigments such as copper phthalocyanine blue and Benzidine Yellow, aqueous pigment dispersion products prepared by finely and stably dispersing pigments in an aqueous medium with a surfactant, etc. Specific examples thereof include C.I. Pigment 15:3B (trade name, S.S. Blue GLL; pigment content, 24%; manufactured by Sanyo Color Works, Ltd.), C.I. Pigment Red 146 (trade name, S.S. Pink FBL; pigment content, 21.5%; manufactured by Sanyo Color Works, Ltd.), C.I. Pigment Yellow 81 (trade name, TC Yellow FG; pigment content, about 30%; manufactured by Dainichiseika Color & Chemicals Mfg. Co., Ltd.), and C.I. Pigment Red 220/166 (trade name, TC Red FG; pigment content, about 35%; manufactured by Dainichiseika Color & Chemicals Mfg. Co., Ltd.).

Fluorescent pigments are also usable which are in the form of fine synthetic-resin particles comprising a solid resin matrix and any of various fluorescent dyes dissolved therein. Other usable pigments include pearlescent pigments, metallic powder pigments, phosphorescent pigments, white pigments such as titanium dioxide, and capsular pigments containing a perfume or a thermochromic composition encapsulated therein.

These colorants may be used alone or as a suitable mixture of two or more thereof. The content of the colorant (s) in the ink composition is generally from 1 to 25% by weight, preferably from 2 to 15% by weight.

Water is used as the solvent. If desired and necessary, a water-soluble organic solvent miscible with water may be added.

Examples of the water-soluble organic solvent include ethanol, propanol, butanol, glycerol, sorbitol, triethanolamine, diethanolamine, monoethanolamine, ethylene glycol, diethylene glycol, thiodiethylene glycol, polyethylene glycol, propylene glycol, butylene glycol, ethylene glycol monomethyl ether, ethylene glycol monoethyl ether, diethylene glycol monomethyl ether, diethylene glycol monoethyl ether, ethylene glycol monomethyl ether acetate, sulfolane, 2-pyrrolidone, and N-methyl-2-pyrrolidone.

The water is used in an amount of generally from 10 to 80% by weight, preferably from 20 to 75% by weight. Those water-soluble organic solvents may be used alone or in combination of two or more thereof in an amount of generally from 2 to 60% by weight, preferably from 5 to 35% by weight.

One or more water-soluble resins can be used for the purpose of enhancing adhesion to paper surfaces or thickening the ink composition. Examples thereof include alkyd resins, acrylic resins, styrene/maleic acid copolymers, cellulose derivatives, polyvinylpyrrolidone, poly(vinyl alcohol), and dextrin. Such water-soluble resins may be used in an amount of from 1 to 30% by weight based on the ink composition.

Other ingredients which may be optionally used include: pH regulators such as ammonia, inorganic salts, e.g., sodium carbonate, sodium phosphate, and sodium acetate, and organic basic compounds, e.g., water-soluble amine compounds; rust preventives such as benzotriazole, tolyltriazole, dicyclohexylammonium nitrite, diisopropylammonium nitrite, and saponin; anticeptics or fungicides such as carbolic acid, sodium salt of 1,2-benzothiazolin-3-one, sodium benzoate, sodium dehydroacetate, potassium sorbate, propyl p-hydroxybenzoate, and 2,3,5,6-tetrachloro-4-(methylsulfonyl)pyridine; lubricants such as metal soaps, polyalkylene glycols, fatty acid esters, cationic surfactants of the ethylene oxide adduct type, phosphate type surfactants, thiocarbamates, and dimethyldithiocarbamates; wetting agents such as urea, nonionic surfactants, sorbitol, mannitol, sucrose, glucose, hydrolyzates of reducing starches, and sodium pyrophosphate; defoaming agents such as dimethylpolysiloxane; dispersants; and fluorochemical or nonionic surfactants for improving ink permeability.

A polymer having substantially no shear-thinning properties may be added as a binder or for the purpose of imparting water resistance. Examples of the polymer include linear polymers such as poly(vinyl alcohol), polyvinylpyrrolidone, poly(acrylic acid) resins, and styrene/maleic acid resins. It is possible to use the surfactant represented by general formula (1) in combination with a known ingredient having shear-thinning properties, such as a resin, gum, thickening polysaccharide, or inorganic particulate material. The term "shear-thinning properties" used for the ink composition of the present invention means the rheological properties of a substance in which the substance is exceedingly viscous and hardly flowable when allowed to stand still or placed under a low stress, and becomes lowly viscous upon imposition of an increased stress thereon to show satisfactory flowability. Such properties of liquids are called thixotropy or pseudoplasticity.

In the ink composition of the present invention, the three-dimensional network structure is temporarily broken when the ink is under a high shear stress in writing. As a result, that part of the ink which is in the vicinity of the ball comes to have a reduced viscosity suitable for writing, passes through the gap between the ball and the ball house by means of capillary force, and is transferred to the paper surface. When in non-use for writing, all the ink including that in the vicinity of the ball has an increased viscosity, so that the ink can be prevented from leaking out, separating, or flowing backward. Such ink properties can be stably maintained over long.

The effective structures of the writing tips of ball-point pens to be charged with the water-based ball-point pen ink described above are conventional mechanisms in wide use. Examples thereof include: a tip comprising a ball holder formed from a metallic pipe by externally pressing a part thereof in the vicinity of a tip thereof to deform that part inward and a ball held in the ball holder; a tip comprising a ball holder formed by cutting a metallic material with a drill or the like and a ball held therein; and a mechanism comprising a tip formed by cutting a metallic pipe or metallic material and a ball held therein by being pressed forward with a spring.

Examples of the material of the ball include ultrahard alloys, stainless steel, ruby, and ceramics. The diameter thereof may be about from 0.3 to 1.2 mm.

Examples of the reservoir tube in which the ink described above and an ink follower are packed include molded tubes of thermoplastic resins such as polyethylene, polypropylene, and poly(ethylene terephthalate). These reservoir tubes are preferred from the standpoints of the inhibition of ink evaporation and productivity.

The reservoir tube preferably has an inner diameter of from 2.5 to 10 mm.

When the reservoir tube used is a molded tube which is transparent, or colored and transparent, or translucent, it is possible to ascertain the color of the ink, the remaining ink amount, etc.

The reservoir tube may be connected to a tip either directly or through a connecting member.

The reservoir tube may be in the form of a ball-point pen refill, which is fitted into a barrel. Alternatively, a barrel having a tip mounted on its front end may be used as it is as a reservoir tube; in this case, the ink is directly packed into the barrel.

The refill to be fitted into a barrel preferably has an inner diameter of from 2.5 to 5 mm. The barrel to be directly packed with the ink preferably has an inner diameter of from 4 to 10 mm.

The ink follower may be either liquid or solid. Examples of the liquid ink follower include nonvolatile media such as polybutene and silicone oils. If desired and necessary, silica, aluminum silicate, or the like may be added to the media.

Examples of the solid ink follower include resin moldings.

A combination of a liquid ink follower and a solid one may be used.

The water-based ball-point pen ink of the present invention is prepared in the same manner as ordinary water-based ball-point pen inks. The ink is directly packed into a reservoir tube having a ball-point pen tip as a writing tip, and is put to practical use in this state in which the ink is in direct contact with the tip.

EXAMPLES

The present invention will be described below in greater detail by giving Examples. The present invention is by no means limited by these Examples.

The tables given below show the composition of each of inks according to the present invention and inks as Comparative Examples, the viscosity thereof as measured at 25° C. with an EM type rotational viscometer at each of 1, 10, and 100 rpm, and the shear-thinning index thereof. The shear-thinning index was measured in the same manner as disclosed in U.S. Pat. No. 5,785,746.

In the tables, the numerals indicating ingredient amounts are given in terms of wt%.

TABLE 1

| Ingredients | Note | Example 1 | 2 | 3 | 4 | 5 | 6 | 7 | 8 |
|---|---|---|---|---|---|---|---|---|---|
| Red acid dye | (1) | 4.0 | | 4.0 | | | | | |
| Yellow acid dye | (2) | | 2.0 | | | | | | |
| Pink fluorescent pigment dispersion | (3) | | | | 20.0 | | | | |
| Red pigment dispersion | (4) | | | | | 15.0 | | | |
| Black pigment dispersion | (5) | | | | | | 30.0 | | |
| Metal paste A | (6) | | | | | | | 7.0 | |
| Metal paste B | (7) | | | | | | | | 2.5 |
| Pearlescent pigment | (8) | | | | | | | | 6.0 |
| Blue pigment dispersion | (9) | | | | | | | | 5.0 |
| Glycerol | | 5.0 | 5.0 | 3.0 | | | 3.0 | 5.0 | 5.0 |
| Ethylene glycol | | | 9.0 | 5.0 | 5.0 | 7.0 | 5.0 | 9.0 | 9.0 |
| Diethylene glycol | | 5.0 | | | | | | | |
| Dialkyl sulfosuccinate A | (10) | 20.0 | 30.0 | | 7.0 | 11.0 | 10.0 | | |
| Dialkyl sulfosuccinate B | (11) | | | | | | | 5.6 | 6.0 |
| Dialkyl sulfosuccinate C | (12) | | | 10.0 | | | | | |
| Amino acid betaine | (13) | | | | 2.0 | | 3.0 | 2.5 | 2.7 |
| Anticeptic A | (14) | 0.2 | 0.2 | 0.2 | 0.2 | 0.2 | 0.2 | | |
| Anticeptic B | (15) | | | | | | | 0.1 | 0.1 |
| Water | | 65.8 | 53.8 | 77.8 | 65.8 | 66.8 | 48.8 | 70.8 | 63.7 |
| Viscosity | | | | | | | | | |
| 100 rpm | | 146 | 107 | 120 | 122 | 73 | 139 | 65 | 75 |
| 10 rpm | | 410 | 205 | 435 | 410 | 172 | 425 | 288 | 330 |
| 1 rpm | | 1226 | 910 | 2816 | 1370 | 538 | 2150 | 1638 | 2000 |
| Shear-thinning index | | 0.5 | 0.5 | 0.3 | 0.5 | 0.5 | 0.4 | 0.3 | 0.5 |

TABLE 2

| Ingredients | Note | Comparative Example 1 | 2 | 3 | 4 | 5 | 6 |
|---|---|---|---|---|---|---|---|
| Red acid dye | (1) | 4.0 | | 4.0 | 3.0 | | |
| Yellow acid dye | (2) | | 2.0 | | | | |
| Pink fluorescent pigment dispersion | (3) | | | | | 20.0 | |
| Red pigment dispersion | (4) | | | | | | 15.0 |
| Glycerol | | 5.0 | 5.0 | 3.0 | 5.0 | | |
| Ethylene glycol | | | 9.0 | 5.0 | | 5.0 | 7.0 |
| Diethylene glycol | | 5.0 | | | 5.0 | | |
| Dialkyl sulfosuccinate A | (10) | 1.0 | 3.0 | | 60.0 | 2.0 | 55.0 |
| Dialkyl sulfosuccinate C | (12) | | | 2.0 | | | |
| Anticeptic A | (14) | 0.2 | 0.2 | 0.2 | 0.2 | 0.2 | 0.2 |
| Water | | 84.8 | 82.6 | 85.8 | 26.8 | 72.8 | 22.8 |
| Viscosity | | | | | | | |
| 100 rpm | | — | 3.5 | 3.0 | 258 | 3.0 | 509 |
| 10 rpm | | 1.7 | 10.0 | 5.0 | 742 | 8.0 | 1894 |
| 1 rpm | | 1.7 | 10.0 | 9.0 | 2560 | 9.0 | 5120 |

TABLE 2-continued

| Ingredients | Note | Comparative Example | | | | | |
|---|---|---|---|---|---|---|---|
| | | 1 | 2 | 3 | 4 | 5 | 6 |
| Shear-thinning index | | 1.0 | 0.5 | 0.8 | 0.5 | 0.6 | 0.5 |

The ingredients given in the tables are described below in order of note number.
(1) Phloxine (manufactured by Aizen Co., Ltd.; C.I. Acid Red 92, C.I. 45410)
(2) Water Yellow 6C (manufactured by Orient Chemical Industries Ltd.; C.I. Acid Yellow 42S)
(3) Pink fluorescent pigment dispersion (manufactured by Sinloihi Co., Ltd.; SINLOIHI COLOR BASE SF-5017; solid content, 36%).
(4) Red pigment dispersion (manufactured by Sanyo Color Works, Ltd.; SANDYE SUPER RED BS; solid content, 32%)
(5) Carbon black dispersion (manufactured by Sanyo Color Works, Ltd.; SANDYE SUPER BLACK C; solid content, 30%)
(6) Aluminum paste (average diameter of aluminum particles, 7 μm; solid content, 60%)
(7) Aluminum paste (manufactured by Toyo Aluminum K. K.; ALUPASTE WJP-U75C; average diameter of aluminum particles, 14 μm; solid content, 50%)
(8) Pearlescent pigment (manufactured by Merck Japan Ltd.; IRIODIN 221 WII)
(9) Blue pigment dispersion (manufactured by Fuji Pigment Co., Ltd.; solid content, 20%)
(10) Sodium di(2-ethylhexyl)sulfosuccinate (manufactured by Tokyo Kasei Kogyo Co., Ltd.)
(11) Sodium di(2-ethylhexyl)sulfosuccinate (manufactured by Nikko Chemicals Co., Ltd.; OTP-100)
(12) Sodium di(isododecyl)sulfosuccinate (manufactured by Kao Corp.; PELEX TR)
(13) (Coconut oil fatty acid amide) propyldimethylaminoacetic acid betaine (manufactured by Nikko Chemicals Co., Ltd.; AM-3130N)
(14) Carbolic acid
(15) 1,2-Benzothiazolin-3-one solution (manufactured by Zeneca Co.; PROXEL XL-2)

The ingredients shown in each of Examples 1 to 6 and Comparative Examples 1 to 6 were mixed together. Each mixture was stirred with a mixer for 1 hour and then filtered. Thus, water-based ball-point pen inks were obtained.

With respect to each of Examples 7 and 8, a dispersion obtained beforehand by adding an aluminum paste to a medium containing both a dialkylsulfosuccinate and an amino acid type betaine was mixed with the other ingredients to obtain a water-based ball-point pen ink.

Inks according to the present invention and comparative inks were prepared by the above methods. The inks of Examples 1 to 6 and Comparative Examples 1 to 6 were used in the following manner. A ball-point pen refill comprising a polypropylene pipe having fitted to one end thereof a stainless-steel tip containing a ball with a diameter of 0.5 mm held therein was charged with each ink. Subsequently, an ink follower was inserted into the pipe so that it came into close contact with the rear end of the ink. This ball-point pen refill was fitted into a barrel to fabricate a ball-point pen.

The inks of Examples 7 and 8 were used in the following manner. A ball-point pen refill comprising a polypropylene pipe having fitted to one end thereof a stainless-steel tip containing a ball with a diameter of 0.7 mm held therein was charged with each ink. Subsequently, an ink follower was inserted into the pipe so that it came into close contact with the rear end of the ink. This ball-point pen refill was fitted into a barrel to fabricate a ball-point pen.

The ball-point pens thus obtained were used, as they were, for writing on paper to examine the ink consumption, ink transferability (visually judged), and ink oozing from the nip.

The results obtained are shown below.

TABLE 3

| Test item | Example | | | | | | | |
|---|---|---|---|---|---|---|---|---|
| | 1 | 2 | 3 | 4 | 5 | 6 | 7 | 8 |
| Ink consumption (mg) | 130 | 95 | 85 | 92 | 105 | 99 | 153 | 190 |
| Ink transferability in writing | B | B | A | A | A | A | A | A |
| Ink oozing | A | A | A | A | A | A | A | A |

TABLE 4

| Test item | Comparative Example | | | | | |
|---|---|---|---|---|---|---|
| | 1 | 2 | 3 | 4 | 5 | 6 |
| Ink consumption (mg) | 354 | 422 | 257 | 70 | 240 | incapable of writing |
| Ink transferability in writing | D | D | C | E | D | F |
| Ink oozing | C | C | C | A | C | A |

The values of ink composition given in the tables were calculated after a line was drawn over 100 m with an automatic writing tester.

The conditions under which the automatic writing tester was operated included a writing speed of 4 m/min, a writing load of 100 g, and a writing angle of 70°.

In the examination of ink oozing, each uncapped ball-point pen was allowed to stand for 5 hours in such a manner that the nip faced downward (the pen was held inverted), and the nip was then examined for ink accumulation.

Ink transferability in writing was judged based on the following criteria.

A: Neither insufficient ink transfer nor line breakage occurred, and feathering did not occur.
B: Neither insufficient ink transfer nor line breakage occurred, but slight feathering occurred.
C: Neither insufficient ink transfer nor line breakage occurred, but feathering occurred.
D: Neither insufficient ink transfer nor line breakage occurred, but considerable feathering occurred.
E: Insufficient ink transfer and line breakage occurred, but feathering did not occur.
F: Unable to be judged.

Ink oozing was judged based on the following criteria.
A: No ink oozing was observed.
C: Ink oozing or dripping occurred in a large amount.

In each examination, five ball-point pens were tested and the results thereof were averaged.

The water-based ball-point pen ink composition provided by the present invention is characterized by containing, as an agent for imparting shear-thinning properties, at least one member selected from the specific sulfosuccinates. When this ink is applied to a ball-point pen of the type in which an ink is directly packed into a reservoir tube, this ball-point pen is free from ink oozing, feathering, insufficient ink transfer, and other troubles when used in writing, and thus shows satisfactory writing performances.

What is claimed is:

1. A water-based ball-point pen ink composition comprising a colorant water, a betaine selected from the group consisting of lauryldimethyl aminoacetic acid betaine, stearyldimethylaminoacetic acid betaine, (coconut oil fatty acid mide)propyldimethylaminoacetic acid betaine and lauramidepropyl betaine, and as an agent for imparting shear-thinning properties at least one member selected from sulfosuccinates which are represented by the following general formula (1):

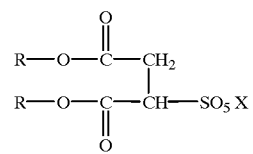

(1)

wherein each R represents an alkyl or alkenyl group having 7 to 18 carbon atoms and X represents an alkali metal or an amine, the content of said at least one member being from 5 to 50% by weight, and wherein the composition has a viscosity of from 20 to 200 mPa.s (25° C.) as measured with an E type rotational viscometer at 100 rpm and a shear-thinning index of from 0.1 to 0.7.

2. The water-based ball-point pen ink composition of claim 1, wherein the content of said at least one member selected from the sulfosuccinates is from 5 to 20% by weight.

* * * * *